Dec. 30, 1952     R. E. WILSON, JR     2,623,421
WORK BRACING MEANS FOR DRILL PRESSES
Filed June 23, 1951     2 SHEETS—SHEET 1
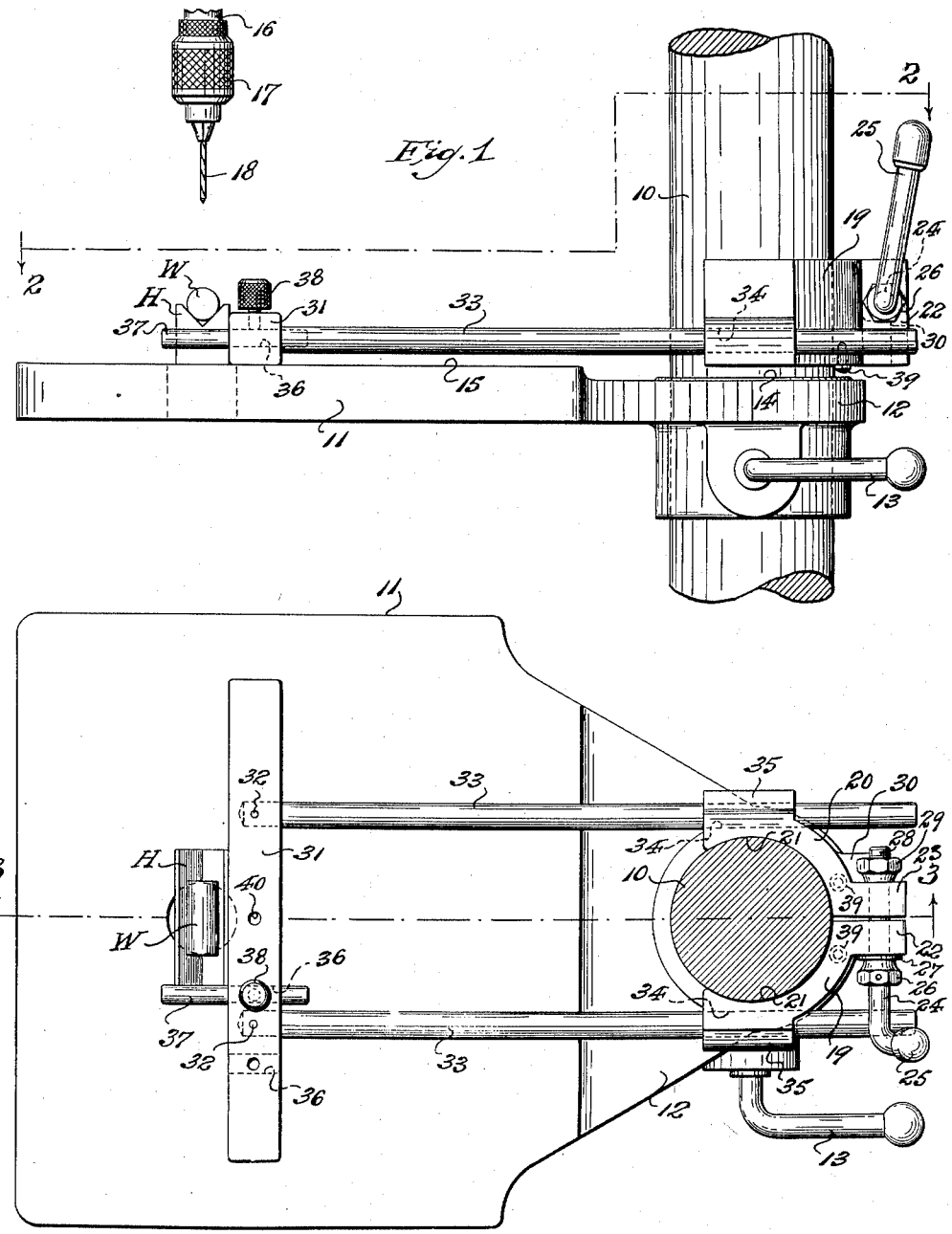
INVENTOR.
Robert E. Wilson, Jr.,
BY George D. Richards,
Attorney Dec. 30, 1952 R. E. WILSON, JR 2,623,421
WORK BRACING MEANS FOR DRILL PRESSES
Filed June 23, 1951 2 SHEETS—SHEET 2

INVENTOR.
Robert E. Wilson, Jr.,
BY George D. Richards
Attorney

Patented Dec. 30, 1952

2,623,421

UNITED STATES PATENT OFFICE 2,623,421

WORK BRACING MEANS FOR DRILL PRESSES

Robert E. Wilson, Jr., Belleville, N. J.

Application June 23, 1951, Serial No. 233,169

3 Claims. (Cl. 77—63)

Drill presses now in common use generally comprise two types; one wherein the work supporting table is perforate, i. e. provided with suitably located openings or slots, for the reception of the anchoring bolts of detachable clamps by which to secure the work upon the table subject to the drilling operation; and the other wherein the work supporting table is imperforate, so that the work can only be secured upon the table by manipulatable clamps which are arranged to straddle marginal portions of the table. In both said types of drill presses, the work clamping devices must be directly affixed to the table itself, and application thereof to the table and work usually takes more time and labor than does the drilling operation desired to be performed. As a result of this, in order to save trouble and time, the operator of the drill press is frequently tempted to neglect the use of clamping devices and to depend upon hand strength alone for holding the work or work carrying fixture in place upon the table surface subject to the drilling operation; thus pitting physical strength alone against the torque of the power driven drill tool. Such practice of hand holding the work upon the supporting table of a drill press is highly undesirable, since it involves great risk of inaccurate drilling and spoiled work; the bending and breaking of drills; and, above all, great risk and danger of accident involving personal injury to the operator. Upon any of these occurrences it will be obvious that time is lost rather than gained by the practice.

The prevalence of the practice of hand holding the work upon a drill press table indicates the need for a quick acting and yet safe work holding or bracing means which avoids the use of table attached clamps and the time consuming labor of applying the latter to the table and work.

Having the above in view, it is an object of this invention to provide a novel work bracing means which is supported by the drill press column for adjustable extension thereof onto the work table surface, so that the work can be quickly applied thereto and firmly braced thereby when supported upon the table subject to the drilling operation, and thereupon safely hand held during such operation.

Another object of this invention is to provide a work bracing means cooperative with the drill press table, said bracing means being supported by clamp jaws having manipulatable means to quickly engage the same with or disengage the same from the column of the drill press, said bracing means including a brace bar having supporting rods slidably related to and extending from said clamp jaws, whereby to dispose said brace bar in a selected adjusted position upon the work supporting table of the drill press relative to the path of vertical movement of the press drill; said clamp jaws, when moved to column gripping condition, operating both to lock the brace bar supporting rods against displacement from selected adjusted relation to the clamp jaws and, at the same time, to tensionally stress said supporting bars in such manner as to effect downward thrust of the brace bar against the surface of the work table, whereby to frictionally grip the latter so as to further assure against displacement of the brace bar from a selected adjusted position thereof on the work table.

Other objects and advantages will appear as the following specific description is read in connection with the accompanying drawings, in which:

Fig. 1 is a fragmentary side elevational view of a drill press showing its work table as supported by the press column beneath the press drill, and further showing a work bracing means according to this invention with its clamp jaws in operative gripped engagement with the press column whereby to support a brace bar assembly in a selected adjusted fixed position upon the work table; and Fig. 2 is a horizontal sectional view, taken on line 2—2 in Fig. 1.

Similar characters of reference are employed in the above described views, to indicate corresponding parts.

Figure 3:
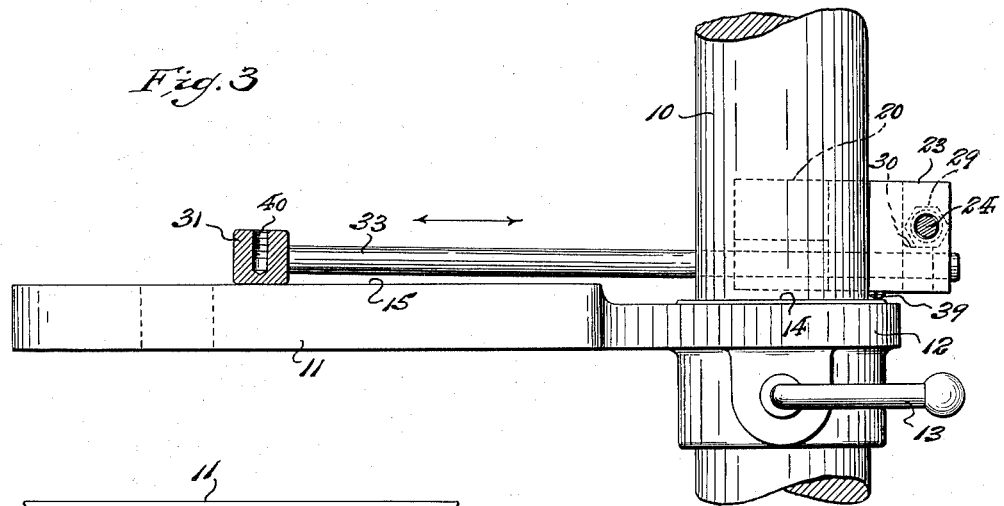
Fig. 3 is a vertical longitudinal sectional view, taken on line 3—3 in Fig. 2, but showing the column gripping clamp jaws in released relation to the column so that the brace bar assembly is freed for positional adjustment on the work table, the work being omitted in this view.

Referring to the drawings, the reference character 10 indicates the cylindrical vertical column of a drill press by which is supported, in outward extension therefrom, a work table 11. Said work table is provided with a rearwardly projecting bracket hub 12, which is vertically adjustable on the column 10, and can be fixed in selected adjusted position by its clamp-lock lever 13, whereby to selectively space the work table below the press drill, in manner well known to the art. The top surface 14 of said bracket hub 12 is stepped down to a plane spaced below the plane of the top surface 15 of the work table. The reference character 16 indicates the press spindle which carries the drill chuck 17 for holding a drill 18.

The work bracing means according to this invention comprises a pair of opposed clamp jaws 19—20 which straddle the press column 10 above the bracket hub 12 of the work table 11. Said clamp jaws are respectively provided with arcuate internal jaw faces 21 of a radius corresponding to the radius of the cylindrical column 10. Projecting radially outward from the rearward inner end of the clamp jaw 19, as an integral part thereof, is a perforate tail-piece 22, and, similarly, projecting radially outward from the rearward inner end of the clamp jaw 20, as an integral part thereof, is a like perforate tail-piece 23. Said perforate tail-pieces 22—23 are opposed one to the other. Means cooperative with the opposed tail-pieces is provided for releasably contracting the clamp jaws, whereby to cause the same to grip and clamp upon the press column 10 in fixed engagement therewith. This means comprises a draw bolt 24 which extends through the perforate tail-pieces 19—20 of the clamp jaws. Said draw bolt terminates at its rearward end in an angularly projecting lever arm 25 by which the same can be manipulated. Pinned on the draw bolt 24, to bear against the outer face of the tail-piece 22 of clamp jaw 19, is a collar 26. A washer 27 is preferably interposed between said outer face of the tail-piece 22 and said collar 26. The forward or free end portion of the draw bolt 24 terminates in a screw-threaded section 28 which threads into a draw nut 29 adapted to bear against the outer face of the tail-piece 23 of the opposite clamp jaw 20. The clamp jaw 20 is provided with a stop projection 30 which is disposed to underlie a face of the draw nut 29, whereby to hold the latter against rotation when the draw bolt 24 is turned.

Disposed to lie upon the work table 11, in transverse extension thereover, is a brace bar 31 of substantial length. Said brace bar is preferably of polygonal cross-sectional shape. Affixed to the brace bar 31, as e. g. by fastening pins 32, are a pair of laterally spaced, rearwardly extending supporting rods 33, the free end portions of which respectively extend slidably through ways or passages 34 with which external side portions 35 of the clamp jaws 19 and 20 are respectively provided. By reason of the slidable relation of said supporting rods 33 to the respective clamp jaws 19 and 20, when the latter are released from gripping engagement with the press column 10, the brace bar 31 can be moved outwardly or inwardly upon the work table relative to the vertical path of movement of the press drill, whereby to position said brace bar for bracing engagement with the work as aligned with the press drill subject to a drilling operation. Extending through a suitably located transverse opening 36, with which the brace bar 31 is provided, is a cooperative brace rod 37 which can be projected from the brace bar 31 to extend at a right angle to the front face thereof, thus being adapted to form therewith a right angular recess for the reception of work or means for carrying the work which is to be drilled. Said brace rod 37 is slidably adjustable in the opening 36, whereby to selectively predetermine the extent of its projection outwardly from the brace bar 31, and said brace rod can be fixed in selected adjusted position by a thumb or set screw 38 which is carried by the brace bar. The brace bar 31 may be provided with one or more additional openings 36 for selective use in assembling the brace rod 37 in convenient location relative to the length of the brace bar 31.

In the use of the work bracing means of this invention, the brace bar 31 with its cooperative brace rod 37 is first adjusted on the work table 11 so as to selectively position the work receiving recess formed thereby in such relation to the vertical path of press drill movement as will properly dispose and brace the work to be drilled, according to the character and size of the work. To permit adjusting manipulation of the brace bar 31, the clamp jaws 19—20 are expanded or spread apart to release the same from gripping engagement with the press column 10. This is done by retracting the draw bolt 24. When the clamp jaws are thus spread apart, the same will respectively normally align themselves with the brace bar supporting rods 33, so that the latter may freely slide in the passages 34, and thus free the brace bar 31 so that it may be moved forward or back on the work table 11 as required to bring the same in proper position for bracing support of work to be drilled. When the clamp jaws 19—20 are spread apart, the same will also drop, under gravity, down onto the top surface 14 of the table bracket hub 12 (see Fig. 3). The distance of drop may be controlled by provision of adjustable stop screws 39 in connection with the undersides of the clamp jaws.

After the brace bar 31 has been adjusted to desired position for engagement therewith of the work to be drilled, it can be secured in such position by contracting the clamp jaws 19—20 to gripping engagement with the press column 10; this being done by manipulating the draw-bolt 24 so as to draw together the tail-pieces 22—23 of said clamp jaws. As the clamp jaws are contracted, the closing movement of their jaw faces 21 against and conformable to the cylindrical surfaces of the press column produces two effects in addition to that of gripping said column. First: each clamp jaw is canted laterally, thus likewise canting the supporting rod passages 34 relative to the axes of the brace bar supporting rods 33, and thereby effecting a strong binding grip upon said supporting rods so as to lock the same against longitudinal movement relative to the clamp jaws, whereby the brace bar 31 is firmly held against displacement from the work bracing position to which it has been adjusted. Second: as the jaw faces 21 of the clamp jaws are moved to engage the cylindrical surfaces of the press column 10 so as to conform thereto, the clamp jaws are caused to ride upward on the column from their dropped relaxed positions. As the clamp jaws moved upward on the column, such movement operates to induce a tensional stress in the brace bar supporting rods 33 which reacts upon the brace bar 31 with strong down-thrusting effect thereupon, and thereby urges the bottom of the brace bar into strong frictional binding grip against the top surface of the work table 11, thus further contributing to firm holding of the brace bar securely against shift or displacement from the work bracing position to which it has been adjusted.

Figure 4:
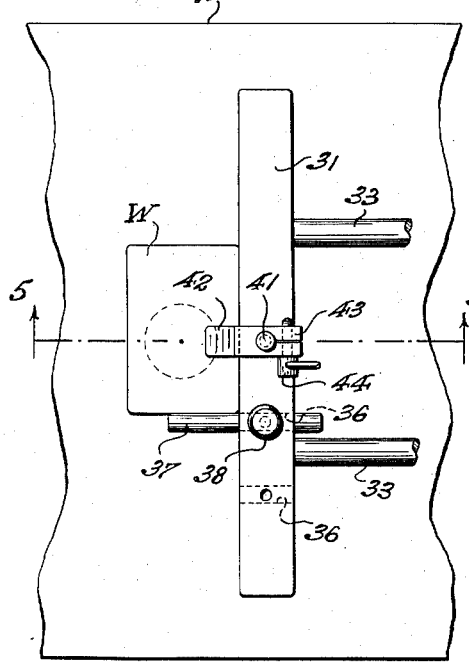
Fig. 4 is a fragmentary plan view showing the attachment to the brace bar of an auxiliary clamp device operative to hold work against upward displacement or lift.

To apply the work to the bracing means of this invention, either a holder H by which the work W is carried (see Figs. 1 and 2), or the work W itself (see Fig. 4), is entered in the right angular recess formed by the brace bar 31 and cooperative brace rod 37, and then hand held so as to abut these parts. As so braced by the brace bar and brace rod, when the work is subjected to the drilling operation, any tendency of the work to shift or rotate under torque thrust of the power driven drill is positively prevented by the immovable bracing means, and transmission of such torque thrust to the operator's hand is likewise eliminated. As a consequence of this no appreciable physical force is required to hold the work in place during the drilling operation, and yet accurate placement of the work beneath the drill is assured. It will also be obvious that, since there is no necessity for the employment of mechanical fastening devices to directly fasten the work to the work table, no time and labor is lost in placing and holding work upon the table subject to the drilling operation, and consequently repeated drilling operations can be carried out as rapidly as could be accomplished solely by hand holding of the work, and yet with assured safety to the operator, since risk of accidental shift or displacement of the work during the drilling operation is eliminated. By reason of these advantages, the work bracing means of this invention is of especial convenience when operating a drill press on a production basis requiring repetition of the drilling operation with respect to a succession of the same kind of work units.

Figure 5:
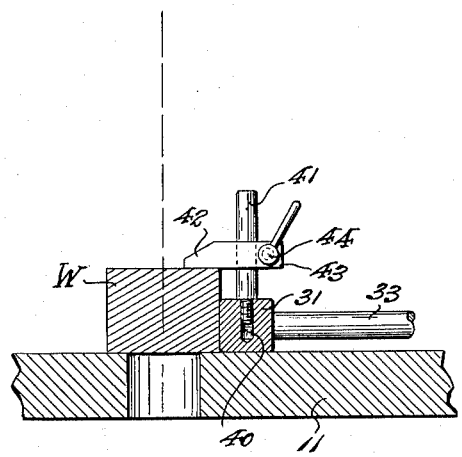
Fig. 5 is a vertical sectional view, taken on line 5—5 in Fig. 4.

It may at times be desirable to positively hold a work unit against upward movement. If so, means for such purpose can be applied to the brace bar 31. An illustrative form of means for such purpose (see Figs. 4 and 5) comprises the provision of a suitably located internally screw-threaded socket 40 in the top of the brace bar 31. Said socket 40 is adapted to receive the threaded end of a carrying post 41, whereby to mount said post in upstanding relation upon the brace bar. Vertically adjustable on said carrying post 41 is a keeper piece 42 adapted to overhang the front face of the brace bar 31. Said keeper piece is provided with a bifurcate clamp portion 43 to embrace said carrying post, said clamp portion having manipulatable lock screw means 44 for releasably contracting the same in secured relation to the post 41. The keeper piece 42 is adjusted on the post so as to overlap the work W, and is then secured to the post, whereupon said keeper piece will hold the work against shift and upward displacement.

Having now described my invention, I claim:

1. The combination with the column of a drill press and the work table extending therefrom of bracing means to overlie said table against which a hand held work unit can be abutted whereby to be positioned and supported subject to a drilling operation, said work bracing means comprising manipulatable column clamping means provided by a pair of opposed clamp jaws to straddle said column so as to grip opposite sides thereof, said clamp jaws having rearwardly projecting perforate tail-pieces at their meeting ends, a manipulatable draw bolt means cooperative with said tail-piece for releasably moving the clamp jaws into fixed gripping relation to the column, a brace bar to lie transverse to and upon the work table, a pair of supporting rods extending rearwardly from said brace bar, and said clamp jaws being respectively provided with laterally projecting external side members having longitudinal passages through which the respective supporting rods slidably extend, whereby to adjustably position the brace bar on the work table toward and from said column, said clamp jaws, when moved into fixed gripping relation to the column, operating to cant said side members whereby to frictionally bind said supporting rods in selective brace bar positioning disposition and at the same time induce tensional stress in said supporting rods to bias the same toward the work table, and thus frictionally bind the adjusted brace bar against the work table surface.

2. The combination with the column of a drill press and the work table extending therefrom of bracing means to overlie said table against which a hand held work unit can be abutted whereby to be positioned and supported subject to a drilling operation, said work bracing means comprising manipulatable column clamping means provided by a pair of opposed clamp jaws to straddle said column so as to grip opposite sides thereof, said clamp jaws having rearwardly projecting perforate tail-pieces at their meeting ends, a manipulatable draw bolt means cooperative with said tail-pieces for releasably moving the clamp jaws into fixed gripping relation to the column, a brace bar to lie transverse to and upon the work table, a pair of supporting rods extending rearwardly from said brace bar, said clamp jaws being respectively provided with laterally projecting external side members having longitudinal passages through which the respective supporting rods slidably extend, whereby to adjustably position the brace bar on the work table toward and from said column, said clamp jaws, when moved into fixed gripping relation to the column, operating to cant said side members whereby to frictionally bind said supporting rods in selective brace bar positioning disposition and at the same time induce tensional stress in said supporting rods to bias the same toward the work table, and thus frictionally bind the adjusted brace bar against the work table surface, and a brace rod to extend transversely through said brace bar for outward projection from the outer face of the latter at a right angle thereto, whereby to form therewith a right angular reception recess to support hand held work.

3. The combination with the column of a drill press and the work table extending therefrom of bracing means to overlie said table against which a hand held work unit can be abutted whereby to be positioned and supported subject to a drilling operation, said work bracing means comprising manipulatable column clamping means provided by a pair of opposed clamp jaws to straddle said column so as to grip opposite sides thereof, said clamp jaws having rearwardly projecting perforate tail-pieces at their meeting ends, a manipulatable draw bolt means cooperative with said tail-pieces for releasably moving the clamp jaws into fixed gripping relation to the column, a brace bar to lie transverse to and upon the work table, a pair of supporting rods extending rearwardly from said brace bar, said clamp jaws being respectively provided with laterally projecting external side members having longitudinal passages through which the respective supporting rods slidably extend, whereby to adjustably position the brace bar on the work table toward and from said column, said clamp jaws, when moved into fixed gripping relation to the column, operating to cant said side members, whereby to frictionally bind said supporting rods in selective brace bar positioning disposition and at the same time induce tensional stress in said supporting rods to bias the same toward the work table, and thus frictionally bind the adjusted brace bar against the work table surface, and a brace rod to extend transversely through said brace bar for outward projection from the outer face of the latter at a right angle thereto, whereby to form therewith a right angular reception recess to support hand held work, said brace bar having a plurality of longitudinally spaced transverse openings for selective reception of said brace rod, and means for releasably securing said brace rod in a selected opening.

ROBERT E. WILSON, Jr.

REFERENCES CITED

The following references are of record in the file of this patent:

UNITED STATES PATENTS

| Number | Name | Date |
|---|---|---|
| 1,189,667 | Costello | July 4, 1916 |
| 2,276,819 | Boehmer | Mar. 17, 1942 |
| 2,445,103 | Betts | July 13, 1948 |
| 2,526,553 | Glantz | Oct. 17, 1950 |